March 31, 1931. O. G. KEIL 1,799,100
PUMPING UNIT
Filed Jan. 28, 1928  2 Sheets-Sheet 2

Inventor:-
Otto G. Keil,
by his Attorneys
Howson & Howson

Patented Mar. 31, 1931

1,799,100

UNITED STATES PATENT OFFICE

OTTO G. KEIL, OF LOS ANGELES, CALIFORNIA, ASSIGNOR TO LINK-BELT COMPANY, OF CHICAGO, ILLINOIS, A CORPORATION OF ILLINOIS

PUMPING UNIT

Application filed January 28, 1928. Serial No. 250,173.

This invention relates primarily to improvements in pumping units of a type used in oil well practice, and the principal object of the invention is to provide novel and improved means for obtaining changes in the speed ratio between the motor and the driven member.

While the invention has a particular application to the aforesaid pumping units, it may in principle and advantageously be applied to other mechanisms.

In the attached drawings:

Figs. 4 and 5 are, respectively, fragmentary sectional views illustrating details of the invention.

Figure 1:
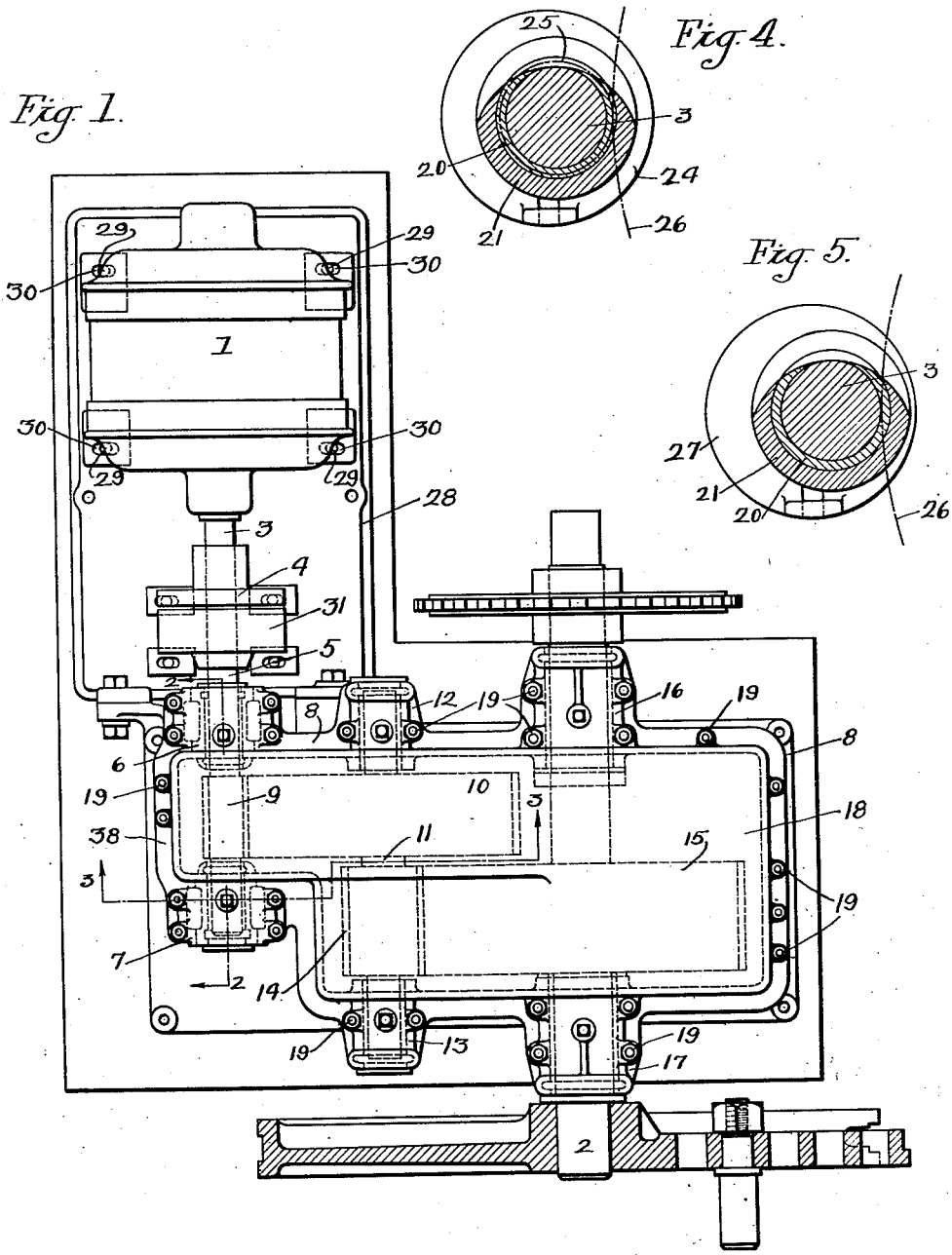
Figure 1 is a plan view of a pumping unit made in accordance with the present invention.

In Fig. 1 of the drawings, I have illustrated a pumping unit consisting primarily of a motor 1 constituting the prime mover, a crank shaft 2 constituting the driven member, and intermediate transmission connecting these elements. In the present instance, the motor shaft 3 is connected through a flexible coupling 4 with a jack shaft 5 mounted in bearings 6 and 7 in a housing 8. That portion of the shaft 5 within the housing carries a pinion 9 which meshes with a gear 10 mounted on a shaft 11 also journaled in the casing 8 in bearings 12 and 13. The shaft 11 carries a pinion 14 which meshes with a gear 15 on the shaft 2, the latter being journaled in bearings 16 and 17 in the housing. Access to the interior of the housing 8 and to the gears and bearings may be had by removing the upper portion or cover 18 of the housing which is secured to the base by means of bolts 19.

In the operation of this class of unit, it is sometimes desirable to change the ratio of speeds between the prime mover which, in the present instance, is the electric motor 1, and the driven member constituted by the crank shaft 2. In units of the type involved, the parts are relatively heavy and cumbersome, and the operation of changing the speed ratio has been a difficult and laborious one. By the present invention, I have provided means whereby the necessary speed changes may be obtained by simple replacement of the shaft 5 and its pinion (where the shaft and pinion are made in one), or of the pinion 9 on the shaft, and by a transverse or horizontal adjustment of the shaft axis as hereinafter described to compensate for the differences in the sizes of the pinions.

Figure 2:
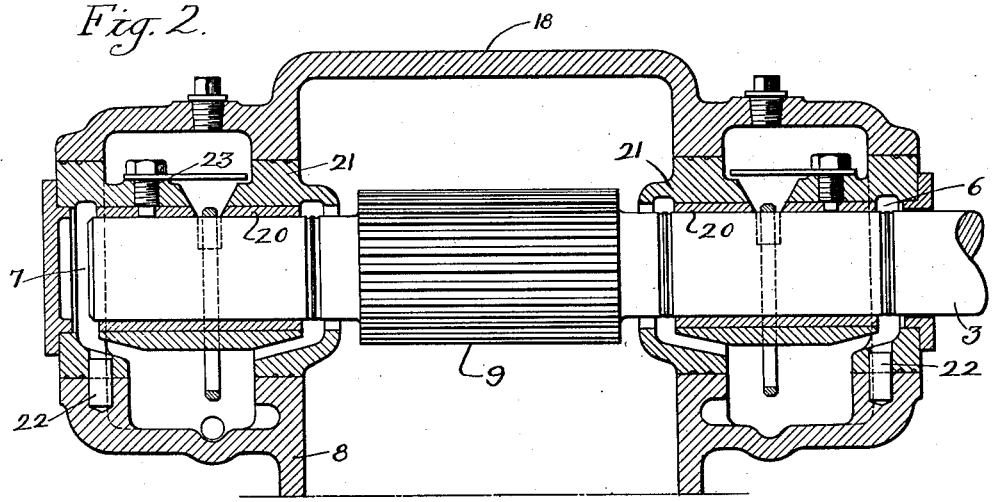
Fig. 2 is a section on the line 2—2, Fig. 1.
Figure 3:
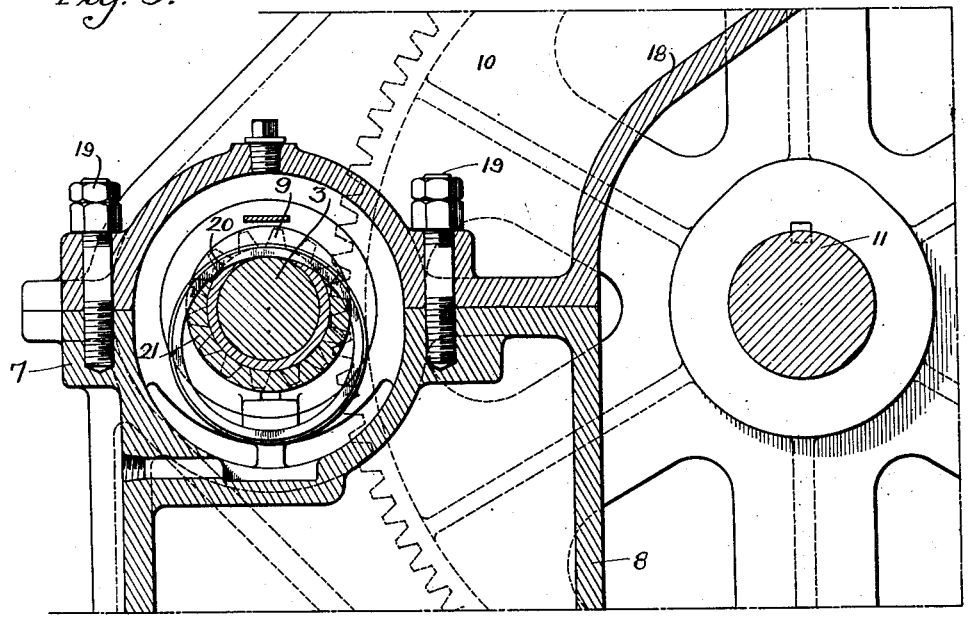
Fig. 3 is a section on the line 3—3, Fig. 1.

Referring to Figs. 2 and 3, it will be noted that each of the bearings 6 and 7 comprises a suitable bushing 20 which immediately surrounds the shaft journal and which is mounted in a cage 21, which latter is held in position in the casing 1 by means in the present instance of a dowel 22. In the present instance, the bushing 20 is secured in the cage 21 by means of a set screw 23. In all respects, the bearings 6 and 7 are identical and the parts thereof are interchangeable.

In the instance illustrated in Figs. 2 and 3, the openings in the cage 21 in which the bushings 20 are seated are concentric with the openings in the casing in which the said cage is seated. This is clearly illustrated in Fig. 3. The arrangement provides, however, for the use of alternative cages having openings for reception of the bushing 20 which are more or less eccentric, as illustrated in Figs. 4 and 5. Thus in Fig. 4, a bushing 24 is used having a given eccentricity in a horizontal direction towards the gear 10 with which the pinion on the shaft 3 meshes, so that in this instance the shaft 3 occupies a position closer to the shaft 11 and therefore provides for the use of a smaller pinion than the pinion 9 illustrated in Figs. 2 and 3, the pitch circle of this smaller pinion being indicated at 25 in Fig. 4, while the gear 10 is indicated by its pitch circle designated 26. In Fig. 5, a cage 27 is used having an opening of still greater eccentricity, this providing for use of a pinion of still lesser diameter to mesh with the gear 10.

It will be apparent that by reversing the cages 24 and 27 and by placing the cage previously used in the bearing 6 in the bearing 7, and vice versa, the eccentricity of the journal may be varied in the opposite direction, that is, away from the gear 10 so that larger pinions than the pinion 9 used in the concentric position as shown in Figs. 2 and 3 may be used. Thus, with two sets of eccentric cages as shown in Figs. 4 and 5, and with the concentric cage 21 illustrated in Figs. 2 and 3, five different pinions may be used to mesh with the gear 10, affording five different changes of speed. Cages having still different or intermediate degrees of eccentricty may be added for other speed changes.

In using the eccentric bushings described above, it is obvious that the shaft 3 must be adjusted transversely in accordance with the degree of eccentricity of the cage opening. Provision for such transverse adjustment of the shaft is afforded in the present instance by securing the motor 1 to the base 28 through the medium of bolts 29 which pass through transverse slots 30 which may be either in the base or in the motor pedestal. By loosening the bolts, the motor may be adjusted on the base in accordance with the desired position of the shaft 3. Where, as in some instances, a brake 31 is used in connection with the shaft 3, the brake parts may also be slidably mounted on the base 28, as indicated in Fig. 1.

By the foregoing arrangement, it will be apparent that the speed changes may be accomplished with facility by merely dismounting the shaft 5 and by either replacing the shaft with another one carrying a different pinion of desired size or by replacing the pinion on the shaft. In each instance, the bearings are adjusted by merely withdrawing the cage and by inserting another cage of different eccentricity or of no eccentricity at all. In these adjustments, the motor retains its original position vertically and is adjusted by simple horizontal movement on the base to the different positions.

While primarily useful for the purpose outlined above, the device may be used for other ends, such for example, as to adjust or vary the depth of mesh of the gear teeth as is sometimes desirable. It should also be understood that the benefits of the invention may be realized to some extent by embodiments other than that herein set forth for the purpose of illustrating the invention.

I claim:

1. In a power unit, the combination with a motor, of a drive shaft connected with the motor, a housing, fixed bearings in the housing for said drive shaft, a driven shaft, intermeshing gears on said driving and driven shafts, and means including varying and interchangeable journal elements adapted to be seated in said bearings for transversely adjusting the drive shaft with respect to said driven shaft.

2. In a power unit, the combination with a drive shaft and a driven shaft, of a housing, intermeshing gears on said shafts, journal openings in said housing, and bearings for said drive shaft in said journal openings comprising removable bearing elements having openings for reception of the shaft journals and being interchangeable with similar elements having openings of differing degrees of eccentricity transversely with respect to the housing openings in which the said bearing elements are mounted whereby the shaft may be adjusted transversely with respect to the driven shaft.

OTTO G. KEIL.